(12) United States Patent
Bremer et al.

(10) Patent No.: US 8,373,108 B2
(45) Date of Patent: Feb. 12, 2013

(54) INDICIA READING TERMINAL OPERATIVE FOR PROCESSING OF FRAMES HAVING PLURALITY OF FRAME FEATURIZATIONS

(75) Inventors: Edward C. Bremer, Victor, NY (US); William H. Havens, Syracuse, NY (US); Chen Feng, Snohomish, WA (US); Ynjiun P. Wang, Cupertino, CA (US)

(73) Assignee: Hand Held Products, Inc., Skaneateles, NY (US)

( * ) Notice: Subject to any disclaimer, the term of this patent is extended or adjusted under 35 U.S.C. 154(b) by 845 days.

(21) Appl. No.: 12/540,253

(22) Filed: Aug. 12, 2009

(65) Prior Publication Data
US 2011/0036910 A1 Feb. 17, 2011

(51) Int. Cl.
*G06K 7/10* (2006.01)
(52) U.S. Cl. .............................. 250/208.3; 235/472.01
(58) Field of Classification Search ............... 250/208.3; 235/472.01, 375, 462.16, 462.44, 462.46
See application file for complete search history.

(56) References Cited

U.S. PATENT DOCUMENTS

| | | | |
|---|---|---|---|
| 5,010,241 A | 4/1991 | Butterworth | |
| 5,109,241 A * | 4/1992 | Keeney | 396/207 |
| 5,378,883 A | 1/1995 | Batterman et al. | |
| 5,504,367 A | 4/1996 | Arackellian et al. | |
| 5,576,529 A | 11/1996 | Koenck et al. | |
| 5,579,487 A | 11/1996 | Meyerson et al. | |
| 5,703,349 A | 12/1997 | Meyerson et al. | |
| 5,714,745 A | 2/1998 | Ju et al. | |
| 5,717,195 A | 2/1998 | Feng et al. | |
| 5,786,582 A | 7/1998 | Roustaei et al. | |
| 5,811,828 A | 9/1998 | Laser | |
| 5,814,803 A | 9/1998 | Olmstead et al. | |
| 5,814,827 A | 9/1998 | Katz | |
| 5,872,354 A | 2/1999 | Hanson | |
| 5,889,269 A * | 3/1999 | Bridgelall et al. | 235/462.32 |
| 5,920,061 A | 7/1999 | Feng | |
| 6,053,408 A | 4/2000 | Stoner | |
| 6,062,475 A | 5/2000 | Feng | |
| 6,123,263 A | 9/2000 | Feng | |
| 6,318,635 B1 | 11/2001 | Stoner | |
| 6,318,637 B1 | 11/2001 | Stoner | |
| 6,431,452 B2 | 8/2002 | Feng | |

(Continued)

OTHER PUBLICATIONS

U.S. Appl. No. 12/242,244, filed Sep. 30, 2008 entitled, Method and Apparatus for Operating Indicia Reading Terminal Including Parameter Determination.

(Continued)

*Primary Examiner* — Seung C Sohn
(74) *Attorney, Agent, or Firm* — Heslin Rothenberg Farley & Mesiti P.C.

(57) ABSTRACT

The present invention relates to an indicia reading terminal operative to capture and process a succession of frames of image data during an operator activated read attempt. The succession of frames can comprise alternating frames, wherein the alternating frames can have first and second frame featurizations. The frames having the first frame featurization can have a first window position and the frames of the second featurization can have a second window position. In one embodiment, exposure of frames of the first featurization can be controlled according to a first exposure control process and exposure of frames of the second featurization can be controlled according to a second exposure control process. In one embodiment, gain that is applied to image signals of frames of the first featurization can be controlled according to a first gain control process and gain that is applied to image signals of frames of the second featurization can be controlled according to second gain control process.

24 Claims, 9 Drawing Sheets

U.S. PATENT DOCUMENTS

| | | |
|---|---|---|
| 6,637,658 B2 | 10/2003 | Gardiner et al. |
| 6,889,904 B2 | 5/2005 | Bianculli et al. |
| 7,148,923 B2 | 12/2006 | Harper et al. |
| 7,219,843 B2 | 5/2007 | Havens et al. |
| 7,268,924 B2 | 9/2007 | Hussey et al. |
| 7,950,583 B2 * | 5/2011 | Kotlarsky et al. ........ 235/462.46 |
| 2003/0031851 A1 | 2/2003 | Bourdelais et al. |
| 2003/0222147 A1 | 12/2003 | Havens et al. |
| 2003/0226895 A1 | 12/2003 | Havens et al. |
| 2004/0020990 A1 | 2/2004 | Havens et al. |
| 2004/0035933 A1 | 2/2004 | Havens et al. |
| 2004/0129783 A1 | 7/2004 | Patel |
| 2006/0011724 A1 | 1/2006 | Joseph et al. |
| 2006/0202036 A1 | 9/2006 | Wang et al. |
| 2006/0274171 A1 | 12/2006 | Wang |
| 2007/0102520 A1 | 5/2007 | Carlson et al. |
| 2007/0164115 A1 | 7/2007 | Joseph et al. |
| 2009/0026267 A1 | 1/2009 | Wang et al. |
| 2009/0072038 A1 | 3/2009 | Li et al. |

OTHER PUBLICATIONS

U.S. Appl. No. 12/326,443, filed Dec. 2, 2008 entitled Indicia Reading Terminal Having Plurality of Optical Assemblies.

U.S. Appl. No. 12/335,777, filed Dec. 16, 2008 entitled Indicia Reading Terminal Including Frame Processing.

* cited by examiner

FEATURIZATION 1

WINDOW COORDINATES:

$(P_{X,Y}(1), P_{X,Y}(2), P_{X,Y}(3), P_{X,Y}(4))$

EXPOSURE CONTROL PROCESS 1
GAIN CONTROL PROCESS 1

— 101

FEATURIZATION 2

WINDOW COORDINATES:

$(P_{X,Y}(5), P_{X,Y}(6), P_{X,Y}(7), P_{X,Y}(8))$

EXPOSURE CONTROL PROCESS 2
GAIN CONTROL PROCESS 2

INDICIA READING TERMINAL OPERATIVE FOR PROCESSING OF FRAMES HAVING PLURALITY OF FRAME FEATURIZATIONS

FIELD OF THE INVENTION

The invention relates to data collection registers in general, and specifically, to an indicia reading terminal.

BACKGROUND OF THE INVENTION

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button that can be actuated by an index finger. Keyboard and display equipped indicia reading terminals are also presently available. Indicia reading terminals having keyboards and displays are also available. Keyboards and display equipped indicia reading terminals are commonly used in shipping and warehouse applications, and are available in form factors incorporating a display and keyboard. In a keyboard and display equipped indicia reading terminal, a trigger button for actuating the initiating of decoding and output of decoded messages is typically provided in such locations as to enable actuation by a thumb of an operator. Indicia reading terminals in a form devoid of a keyboard and display or in a keyboard and display equipped form are commonly used in a variety of data collection applications including point of sale applications, shipping applications, warehousing applications, security check point applications, and patient care applications. Some indicia reading terminals are adapted to read bar code symbols including one or more of one dimensional bar codes stacked 1D bar codes and two dimensional bar codes. Other indicia reading terminals are adapted to read OCR characters while still other indicia reading terminals are equipped to read both bar code symbols and OCR characters.

SUMMARY OF THE INVENTION

The present invention relates to an indicia reading terminal operative to capture and process a succession of frames of image data during an operator activated read attempt. The succession of frames can comprise alternating frames, wherein the alternating frames can have first and second frame featurizations. The frames having the first frame featurization can have a first window position and the frames of the second featurization can have a second window position. In one embodiment, exposure of frames of the first featurization can be controlled according to a first exposure control process and exposure of frames of the second featurization can be controlled according to a second exposure control process. In one embodiment, gain that is applied to image signals of frames of the first featurization can be controlled according to a first gain control process and gain that is applied to image signals of frames of the second featurization can be controlled according to second gain control process.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
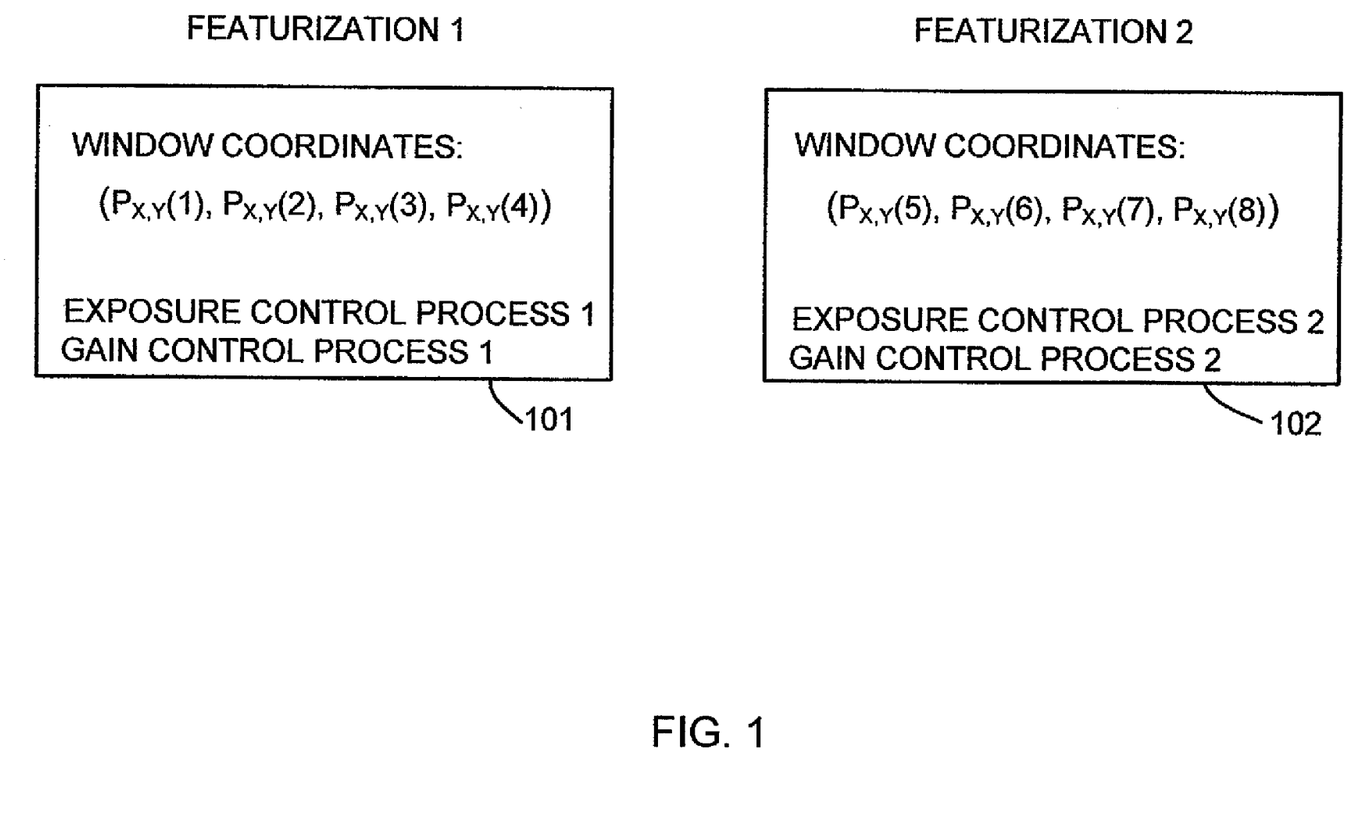
FIG. 1 is a block diagram illustrating functional attributes of an image reading terminal.

There is set forth herein an indicia reading terminal operative to capture and process a succession of frames of image data during an operator activated read attempt. The succession of frames can comprise alternating frames, wherein the alternating frames can have first and second frame featurizations as are indicated in FIG. 1. The frames having the first featurization 101 can have a first window position and the frames of the second featurization 102 can have a second window position. In one embodiment, exposure of frames of the first featurization 101 can be controlled according to a first exposure control process and exposure of frames of the second featurization 102 can be controlled according to a second exposure control process. In one embodiment, gain that is applied to image signals of frames of the first featurization can be controlled according to a first gain control process and gain that is applied to image signals of frames of the second featurization can be controlled according to a second gain control process. While featurizations 1 and 2 are shown in FIG. 1 as having associated window positions, exposure control processes, and gain control processes, it is understood that a featurization as described herein can have fewer than the described defining characteristics (a featurization need not have one or more of an associated window position, an exposure control process, or a gain control process).

Figure 2:
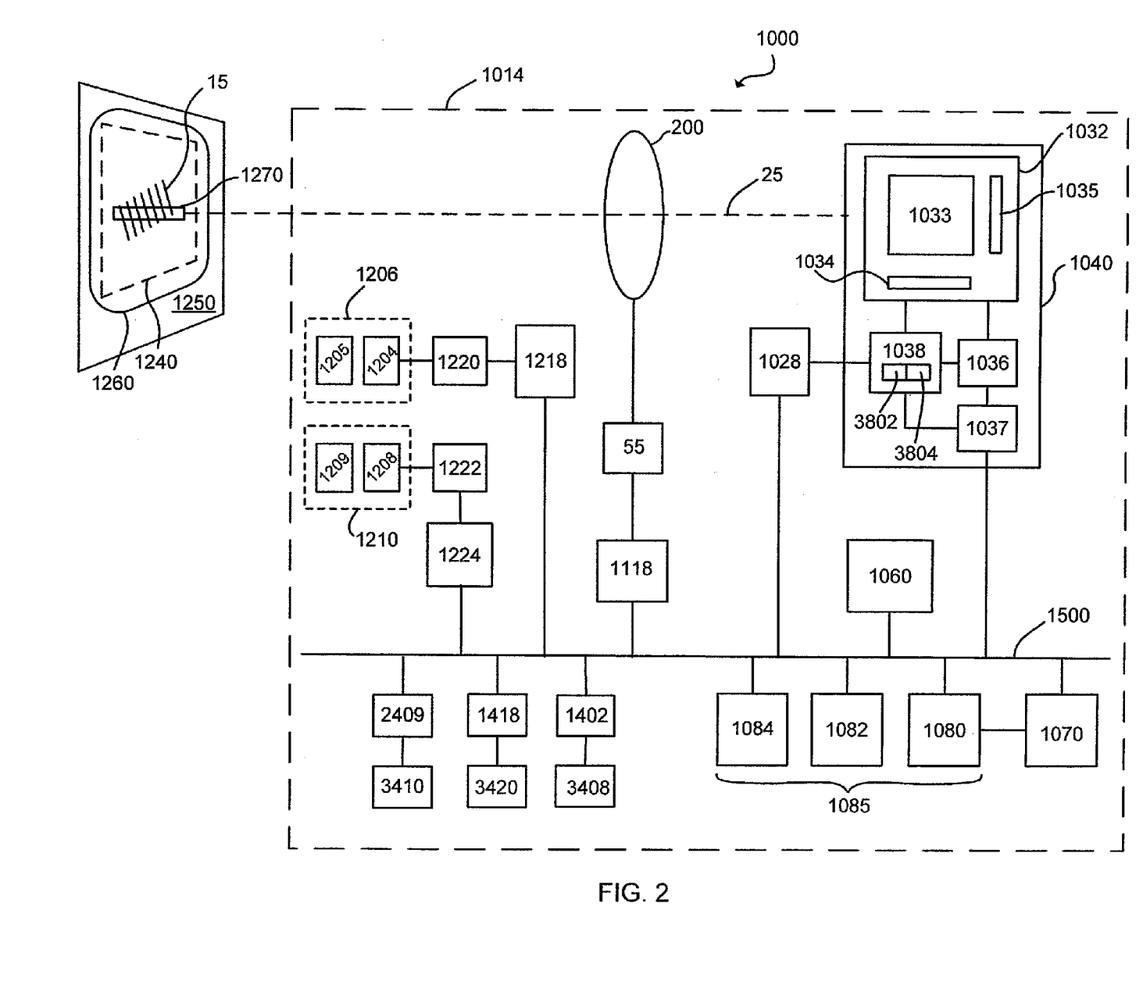
FIG. 2 is an exemplary block diagram of an indicia reading terminal.

An exemplary hardware platform for an indicia reading terminal is shown and described in FIG. 2.

Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. In one example, image sensor integrated circuit 1040 can be provided by an MT9V022 image sensor integrated circuit available from Micron Technology, Inc. In another example, image sensor integrated circuit 1040 can incorporate a Bayer pattern filter. In such an embodiment, CPU 1060 prior to subjecting a frame to further processing can interpolate pixel values for pixel positions intermediate of green pixel position for development of a monochrome frame of image data. Alternatively, CPU 1060 prior to subjecting a frame to further processing an interpolate pixel values at pixel positions intermediate of red pixel positions or blue pixel positions.

In the course of operation of terminal 1000, image signals can be read out of image sensor 1032 and converted and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of terminal 1000, optical assembly 200 can be adapted for focusing an image of a decodable indicia 15 located within a field of view 1240 on a substrate 1250 onto image sensor array 1033. Imaging light rays can be transmitted about imaging axis 25. Optical assembly 200 in one embodiment can be adapted to be capable of multiple focal lengths and multiple best focus distances. In one embodiment, optical assembly 200 can be a fixed optical assembly having a fixed focal length and best focus distance.

Terminal 1000 can also include an illumination pattern light source bank 1204 and associated light shaping optics 1205 for generating an illumination pattern 1260 substantially corresponding to a field of view 1240 of terminal 1000. The combination of bank 1204 and optics 1205 can be regarded as an illumination pattern generator 1206. Terminal 1000 can also include an aiming pattern light source bank 1208 and associated light shaping optics 1209 for generating an aiming pattern 1270 on substrate 1250. The combination of bank 1208 and optics 1209 can be regarded as an aiming pattern generator 1210. In use, terminal 1000 can be oriented by an operator with respect to a substrate 1250 bearing decodable indicia 15 in such manner that aiming pattern 1270 is projected on a decodable indicia 15. In the example of FIG. 2, decodable indicia 15 is provided by a 1D bar code symbol. Decodable indicia 15 could also be provided by a 2D bar code symbol or optical character recognition (OCR) characters. Each of illumination pattern light source bank 1204 and aiming pattern light source bank 1208 can include one or more light sources. Optical assembly 200 can be controlled with use of electrical power input unit 55 which provides energy for changing a plane of optimal focus of optical assembly 200. In one embodiment, an electrical power input unit 55 can operate as a controlled voltage source, and in another embodiment, as a controlled current source. Illumination pattern light source bank 1204 can be controlled with use of illumination pattern light source bank control circuit 1220. Aiming pattern light source bank 1208 can be controlled with use of aiming pattern light source bank control circuit 1222. Electrical power input unit 55 can apply signals for changing optical characteristics of optical assembly 200, e.g., for changing a focal length and/or a best focus distance of (a plane of optimum focus of) optical assembly 200. Where optical assembly 200 is a fixed optical assembly, power input unit 55 and its associated interface 1118 can be deleted. Illumination pattern light source bank control circuit 1220 can send signals to illumination pattern light source bank 1204, e.g., for changing a level of illumination output by illumination pattern light source bank 1204. Aiming pattern light source bank control circuit 1222 can send signals to aiming pattern light source bank 1208, e.g., for changing a level of illumination output by aiming pattern light source bank 1208.

Terminal 1000 can also include a number of peripheral devices including trigger 3408 which may be used to make active a trigger signal for activating frame readout and/or certain decoding processes. Terminal 1000 can be adapted so that activation of trigger 3408 activates a trigger signal and initiates a decode attempt. Specifically, terminal 1000 can be operative so that during an operator activated read attempt activated in response to activation of a trigger signal, a succession of frames can be read out and captured by way of read out of image information from image sensor array 1033 (typically in the form of analog signals) and then storage of the image information after conversion into memory 1080 (which can buffer one or more of the succession of frames at a given time). CPU 1060 can be operative to subject one or more of the succession of frames to a decode attempt. For attempting to decode a bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup.

CPU 1060, appropriately programmed can carry out a decoding process for attempting to decode a frame of image data. Terminal 1000 can be operative so that CPU 1060 for attempting to decode a frame of image data can address image data of a frame stored in RAM 1080 and can process such image data. For attempting to decode, CPU 1060 can sample image data of a captured frame of image data along a sampling path, e.g., along a first sampling path through a first set of pixel positions. Next, CPU 1060 can perform a second derivative edge detection to detect edges. After completing edge detection, CPU 1060 can determine data indicating widths between edges. CPU 1060 can then search for start/stop character element sequences and if found, derive element sequence characters, character by character by comparing with a character set table. For certain symbologies, CPU 1060 can also perform a checksum computation. If CPU 1060 successfully determines all characters between a start/stop character sequence and successfully calculates a checksum (if applicable), CPU 1060 can output a decoded message. Where a decodable indicia representation is a 2D bar code symbology, a decode attempt executed by CPU 1060 can comprise the steps of locating a finder pattern using a feature detection algorithm, locating scan lines intersecting the finder pattern according to a predetermined relationship with the finder pattern, determining a pattern of dark and light cells along the scan lines, and converting each light pattern into a character or character string via table lookup.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1118 for coupling electrical power input unit 55 to system bus 1500, interface circuit 1218 for coupling illumination pattern light source bank control circuit 1220 to system bus 1500, interface circuit 1224 for coupling aiming pattern light source bank control circuit 1222 to system bus 1500, and interface circuit 1402 for coupling trigger 3408 to system bus 1500. Terminal 1000 can also include a display 3420 coupled to system bus 1500 and in communication with CPU 1060, via interface 1418, as well as pointer mechanism 3410 in communication with CPU 1060 via interface 2409 connected to system bus 1500.

A succession of frames of image data that can be captured and subject to the described processing can be full frames (including pixel values corresponding to each pixel of image sensor 1032 or a designated maximum number of pixels of image sensor 1032 subject to addressing and readout during operation of terminal 1000). A succession of frames of image data that can be captured and subject to the described processing (e.g., frame quality evaluation processing) can also be "windowed frames" comprising pixel values corresponding to less than each pixel of image sensor 1032 (or designated maximum number set of pixels of image sensor 1032). A succession of frames of image data that can be captured and subject to the described processing can also comprise a combination of full frames and windowed frames. A full frame can be captured by selectively addressing for readout pixels of image sensor 1032 corresponding to the full frame. A windowed frame can be captured by selectively addressing for read out pixels of image sensor 1032 corresponding to the windowed frame.

Terminal 1000 can capture frames of image data at a rate known as a frame rate. A typical frame rate is 60 frames per second (FPS) which translates to a frame time (frame period) of 16.67 ms. Another typical frame rate is 30 frames per second (FPS) which translates to a frame time (frame period) of 33.33 ms per frame. Where windowed frames are addressed and read out, a frame rate can be increased (and frame time decreased) by reduction of the size of the windowed frame.

A timing diagram illustrating operation of an indicia reading terminal in an exemplary embodiment is shown and described with reference to FIG. 4. Signal 1602 is a trigger signal of which an operator can make active to activate a read attempt by actuation of trigger 3408. Signal 1604 is an exposure control signal wherein logic high periods of signal 1604 indicate exposure control periods of terminal 1000 during which pixels of image sensor array 1033 are in a state of integration. Signal 1606 is a readout control signal. Logic high periods of signal 1606 indicate frame readout periods of terminal 1000. Processing periods $pr_1$, $pr_2$, $pr_3$, $pr_4$, $pr_5$, $pr_6$, $pr_7$, and $pr_8$ indicate the times during which CPU 1060 processes the various frames. Such processing can include processing for attempting to decode, processing for parameter determination, processing for evaluation of frame quality. In one embodiment, each frame captured during an operator read attempt is subject to a decode attempt. In the embodiment as described in connection with the timing diagram of FIG. 4, exposure periods and readout periods are shown as occurring in serial order. In another embodiment, image sensor integrated circuit 1040 can be controlled so that exposure periods and readout periods are in overlapping relation.

In the example described with reference to the timing diagram of FIG. 4, alternating frames that are captured have different associated frame featurizations. For example, frames having the exposure periods $exp_1$, $exp_3$, and $exp_5$ have a first frame featurization and the frames intermediate of the noted frames having the exposure periods $exp_2$, $exp_4$, and $exp_6$ have a second frame featurization. While the window sizes of the frames of the first and second respective featurizations can in theory be equal, in the example of the timing diagram of FIG. 4 they are shown as being different for purposes of illustrating features of operation. In particular, in the described example, the first featurization frames have a much smaller window size than the second featurization frames. Also, while exposure periods can in theory be the same for featurizations of the first and second frames they are shown as being different in the described example.

TABLE A

| Embodiment | 1 | 2 | 3 | 4 | 5 |
|---|---|---|---|---|---|
| 1 | FEATURIZATION 1 WINDOW: Column Start, $c = c_1$ Row Start, $r = r_1$; Window Width, $w = w_1$ Window Height, $h = h_1$ EXPOSURE: $e = e_0(1)$ GAIN: $g = g_0(1)$ | FEATURIZATION 2 WINDOW: Column Start, $c = c_2$ Row Start, $r = r_2$; Window Width, $w = w_2$ Window Height, $h = h_2$ EXPOSURE: $e = e_0(2)$ GAIN: $g = g_0(2)$ | FEATURIZATION 1 WINDOW: Column Start, $c = c_1$ Row Start, $r = r_1$; Window Width, $w = w_1$ Window Height, $h = h_1$ EXPOSURE: $e = f_e(e_{F1}, A_{F1})$ GAIN: $g = f_g(g_{F1}, A_{F1})$ | FEATURIZATION 2 WINDOW: Column Start, $c = c_2$ Row Start, $r = r_2$; Window Width, $w = w_2$ Window Height, $h = h_2$ EXPOSURE: $e = f_e(e_{F2}, A_{F2})$ GAIN: $g = f_g(g_{F2}, A_{F2})$ | FEATURIZATION 1 WINDOW: Column Start, $c = c_1$ Row Start, $r = r_1$; Window Width, $w = w_1$ Window Height, $h = h_1$) EXPOSURE: $e = f_e(e_{F3}, A_{F3})$ GAIN: $g = f_g(g_{F3}, A_{F3})$ |
| 2 | FEATURIZATION 1 WINDOW: Column Start, $c = c_1$ Row Start, $r = r_1$; Window Width, $w = w_1$ Window Height, $h = h_1$ EXPOSURE: $e = e_0(1)$ GAIN: $g = g_0(1)$ | FEATURIZATION 2 WINDOW: Column Start, $c = c_2$ Row Start, $r = r_2$; Window Width, $w = w_2$ Window Height, $h = h_2$ EXPOSURE: $e = e_0(2)$ GAIN: $g = g_0(2)$ | FEATURIZATION 1 WINDOW: Column Start, $c = c_1$ Row Start, $r = r_1$; Window Width, $w = w_1$ Window Height, $h = h_1$ EXPOSURE: $e = f_e(e_{F1}, A_{F1})$ GAIN: $g = f_g(g_{F1}, A_{F1})$ | FEATURIZATION 2 WINDOW: Column Start, $c = c_2$ Row Start, $r = r_2$; Window Width, $w = w_2$ Window Height, $h = h_2$ EXPOSURE: $e = f_e(e_{F2}, A_{F2})$ GAIN: $g = f_g(g_{F2}, A_{F2})$ | FEATURIZATION 1 WINDOW: Column Start, $c = c_1$ Row Start, $r = r_1$; Window Width, $w = w_1$ Window Height, $h = h_1$) EXPOSURE: $e = f_e(e_{F3}, A_{F3})$ GAIN: $g = f_g(g_{F3}, A_{F3})$ |
| Embodiment | 6 | | 7 | 8 | 9 |
| 1 | FEATURIZATION 2 WINDOW: Column Start, $c = c_2$ Row Start, $r = r_2$; Window Width, $w = w_2$ Window Height, $h = h_2$ EXPOSURE: $e = f_e(e_{F4}, A_{F4})$ | | FEATURIZATION 1 WINDOW: Column Start, $c = c_1$ Row Start, $r = r_1$; Window Width, $w = w_1$ Window Height, $h = h_1$ EXPOSURE: $e = f_e(e_{F5}, A_{F5})$ | FEATURIZATION 2 WINDOW: Column Start, $c = c_2$ Row Start, $r = r_2$; Window Width, $w = w_2$ Window Height, $h = h_2$ EXPOSURE: $e = f_e(e_{F6}, A_{F6})$ | . . . |

TABLE A-continued

| | | GAIN: g = $f_g$ ($g_{F4}$, $A_{F4}$) | GAIN: g = $f_g$ ($g_{F5}$, $A_{F5}$) | GAIN: g = $f_g$ ($g_{F6}$, $A_{F6}$) | |
|---|---|---|---|---|---|
| | 2 | FEATURIZATION 2 | FEATURIZATION 1 | FEATURIZATION 2 | ... |
| | | WINDOW: | WINDOW: | WINDOW: | |
| | | Column Start, c = $c_2$ | Column Start, c = $c_1$ | Column Start, c = $c_2$ | |
| | | Row Start, r = $r_2$; | Row Start, r = $r_1$; | Row Start, r = $r_2$; | |
| | | Window Width, w = $w_2$ | Window Width, w = $w_1$ | Window Width, w = $w_2$ | |
| | | Window Height, h = $h_2$ | Window Height, h = $h_1$ | Window Height, h = $h_2$ | |
| | | EXPOSURE: | EXPOSURE: | EXPOSURE: | |
| | | e = $f_e$ ($e_{F4}$, $A_{F4}$) | e = $f_e$ ($e_{F5}$, $A_{F5}$) | e = $f_e$ ($e_{F6}$, $A_{F6}$) | |
| | | GAIN: g = $f_g$ ($g_{F4}$, $A_{F4}$) | GAIN: g = $f_g$ ($g_{F5}$, $A_{F5}$) | GAIN: g = $f_g$ ($g_{F6}$, $A_{F6}$) | |

Further aspects of operation of terminal 1000 in one embodiment are described with reference to Table A, showing aspects of alternating frames of first and second different featurizations in one embodiment. In the example of Table A, Embodiment 1, different windowing parameters (column start, row start, window width, window height) defining a window position, different exposure control processes, and different gain control processes are associated to each respective featurization. In the example of Table A, Embodiment 2, different windowing parameters defining different window positions, and different exposure control processes, are associated to each respective featurization.

In the example of Table A Embodiment 1, an exposure period for the first frame for each featurization (frame 1 for featurization 1, frame 2 for featurization 2) is set to an initial value, $e_0$, and for subsequent frames of each featurization the exposure is determined by a function of the most recent previously applied exposure for the frame of the featurization incremented or decremented by a predetermined value depending on whether a target white level for the most recent frame for the featurization is below or above a threshold. Similarly, the gain applied for the initial frame of each featurization (frame 1 for featurization 1, frame 2 for featurization 2) is set to an initial gain value, $g_0$, and for each frame thereafter the applied gain is calculated as a function of the most recently applied gain for a frame of the featurization incremented or decremented by a predetermined amount depending on whether a white level of a most recent frame for the featurization is below or above a threshold. Numerous other algorithms are possible for calculating exposure and/or gain. A white level (e.g., $A_{F1}$, $A_{F2}$ ...) can be calculated as the average value of frame pixel values or a sampling of such values. In the example of Embodiment 2, exposure control can be provided as described in connection with Embodiment 1. However, in Embodiment 2, gain is a fixed (constant) value for each of the first and second featurizations. A first gain is applied for each frame of the first featurization and a second gain is applied for each frame of the second featurization. However, the first and second gains are not equal. Accordingly, where terminal 1000 is configured in accordance with Embodiment 2, gain switches back and forth between two values during an operator activated read attempt.

Further, different programs can be run on CPU 1060 for calculating exposure values for frames of different featurizations and different programs can be run on CPU 1060 for calculating gain values for frames having a plurality of different featurizations.

In determining applied exposure values for frames of a first featurization, terminal 1000 can preferentially utilize data of frames of the first featurization. In one embodiment, such preferential utilization includes discarding (i.e., not using) previously applied exposure values of second featurization frames and not using white values of second featurization frames.

In determining applied gain values of first featurization frames, terminal 1000 can preferentially utilize data of frames of the first featurization. Such preferential utilization can include discarding (i.e., not using) gain values of second featurization frames and not using white values of second featurization frames.

Referring to further aspects of alternating frames having different featurizations described herein, the different featurizations can have different window positions, and possibly different window sizes. In the example of Table A, window positions are expressed in terms of an offset (column start, row start) and a window size (window width and height). However, terminal 1000 can be operative so that window positions are expressed as an alternative format (i.e., N (N≧3 corner coordinates pixel position coordinates).

For providing fast switching between featurizations, and in one embodiment between one or more of window positions, exposure values and gain values associated with different featurizations, timing and control circuit 1038 of terminal 1000 can be provided to include a plurality of registers for one or more parameter data types (e.g., a windowing parameter register, an exposure parameter register, a gain parameter register), with one register capable of being written to at a time when parameter data (e.g., window, exposure, gain) is being read from for control of image sensor integrated circuit 1040. Examples of image sensor integrated circuits having such functionality are the MT9V023IA7ATC (color) and MT9V023IA7AM (monochrome) image sensor chips of the type from Micron Technology, Inc. Registers provided in plural form in the referenced image sensor integrated circuits available from Micron Technology, Inc. include the following windowing parameter registers: a column start parameter register, row start parameter register, a window width parameter register, a window height parameter register, and the following non-windowing parameter registers: a high dynamic range control parameter register, horizontal blanking parameter register, vertical blanking parameter register, coarse exposure parameter register, fine exposure parameter register, gain parameter register, read mode parameter register, ADC resolution parameter register, black level correction parameter register, and a row noise correction parameter register.

Figure 3:
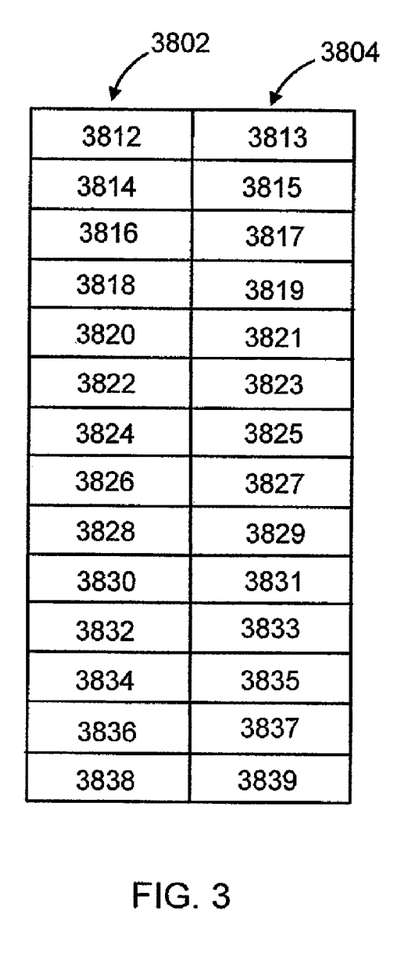
FIG. 3 is a block diagram illustrating plural register arrays.

Referring to the embodiment of FIG. 2, timing and control circuitry 1038 can include first register array 3802 and second register array 3804. First register array 3802 can include a column start parameter register 3812, a row start parameter register 3814, a window width parameter register 3816, a window height parameter 3818 (registers 3812, 3814, 3816, 3818 are windowing parameter registers), a high dynamic range control parameter register 3820, a horizontal blanking parameter register 3822, a vertical blanking parameter register 3824, a coarse exposure parameter register 3826, a fine exposure control parameter register 3828, a gain parameter register 3830, a read mode register 3832, an ADC resolution register 3834, a black level correction register 3836, and a row noise correction parameter register 3838. Second register array 3804 can include a column start parameter register 3813, a row start parameter register 3815, a window width parameter register 3817, a window height parameter register 3819 (registers 3813, 3815, 3817, 3819 are windowing parameter registers), a high dynamic range control parameter register 3821, a horizontal blanking parameter register 3823, a vertical blanking parameter register 3825, a coarse exposure parameter register 3827, a fine exposure control parameter register 3829, a gain parameter register 3831, a read mode register 3833, an ADC resolution register 3835, a black level correction register 3837, and a row noise correction parameter register 3839.

Providing plural registers for one or more parameters provides significant advantages. For illustration of an advantage, an application is considered where frames of a first featurization includes a set of one or more parameters that are constant throughout frames of the first featurization, but which change when there is a switching between featurizations. For example, referring to Embodiment 1 of Table A, windowing parameters remain constant for frames of the first featurization and second featurization but switch when there is a switch between frames having different featurizations. Referring to Embodiment 2 of Table A, windowing parameter control is as described in Embodiment 2, but gain is controlled to be constant whether the first or second featurization is active; however, the constant values for gain are switched between featurizations and, therefore, different depending on which featurization is active. It is seen that if a single register is provided for a parameter, a switching between featurizations where the parameter switches between featurizations would require writing new parameter values to the register, even though the parameter is constant for frames of each of the respective featurizations. Such writing steps, if repeated for several parameters can cause significant time delay; in some cases, more than a frame time. The providing of redundant registers for one or more parameters can accordingly significantly reduce parameter writing time and can facilitate operation of terminal 1000 at a maximum frame rate.

In the example described with reference to Table A, alternating frames of different featurizations are described as having a period of one frame, p=1, (one frame of a first featurization, then one frame of a second featurization then one frame of a first featurization, and so on). In another embodiment, the period of the alternating frames can vary over a succession of frames and the alternating frames of first and second featurizations can have periods of greater than one frame. For example, a set of alternating frames can have a period of two: two frames of a first featurization, two frames of a second featurization, two frames of a first featurization, and so on. The period can change over the course of a succession of alternating frames having different featurizations: one frame of a first featurization, two frames of a second, one frame of a first featurization, two frames of a second, and so on. The period of a set of at least one frame can expand or contract over a succession of frames.

Figure 8:
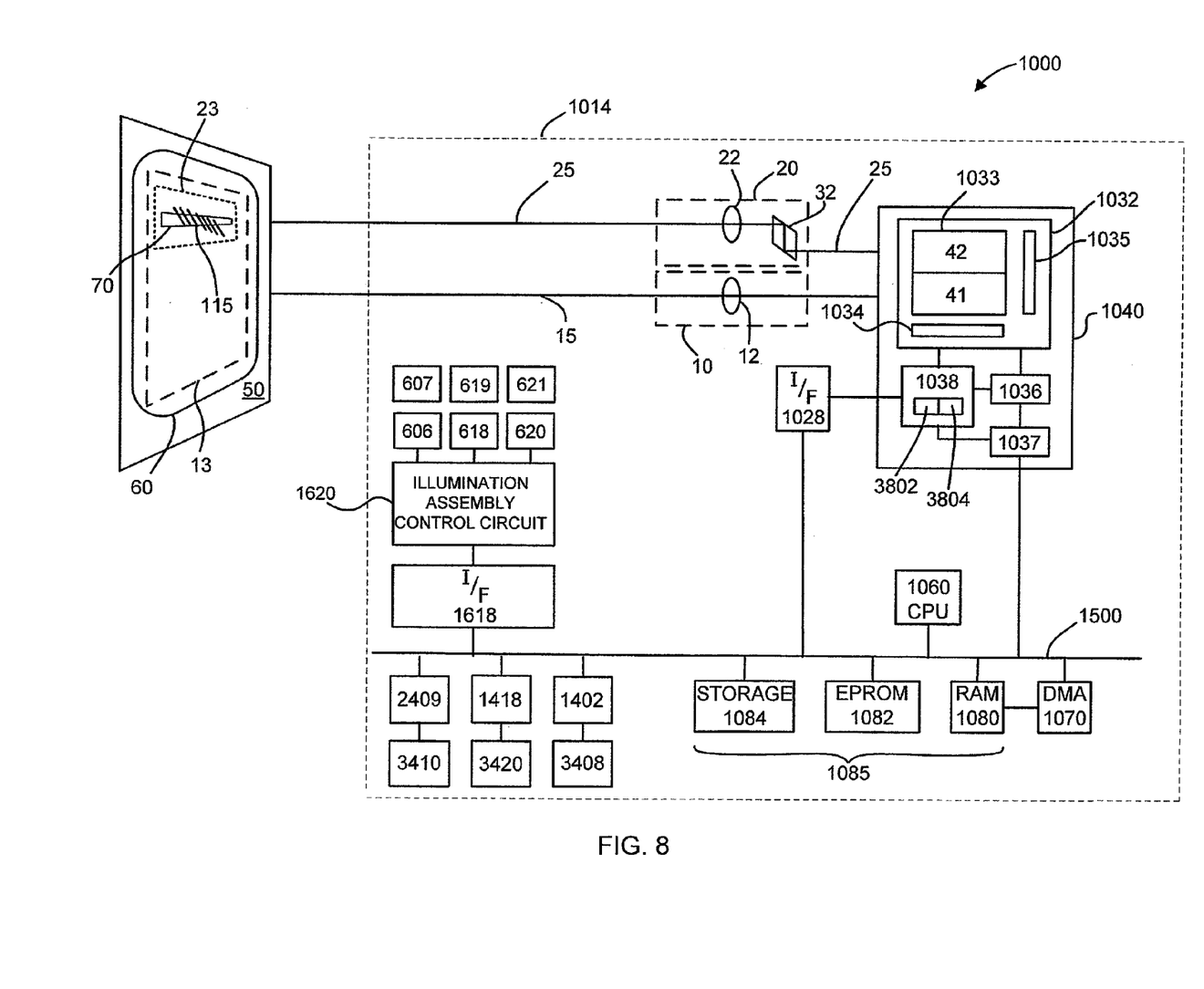
FIG. 8 is a block diagram of an indicia reading terminal in an alternative embodiment.

A terminal operative as described can be utilized in a number of applications. For example, terminal 1000 can be operative so that windows 1802, 1804 of first and second featurizations are established as shown in FIG. 8. Window 1802 of a first featurization is a relatively larger window and window 1804 of a second featurization is a relatively smaller window. In another aspect, an initial exposure, $e_0$, for the first frame of the first featurization having the larger window is set to a shorter time than the initial exposure, $e_0$, for the first frame of the second featurization in which smaller window 1804 is active. Also, an initial gain $g_0$ for the first frame of the first featurization can be set to a smaller value than the gain for the first frame of the second featurization. Such configuration optimizes terminal 1000 for reading indicia at any distance between a shorter and longer range. It was determined that longer range decodable indicia frames can be captured with smaller windows, more exposure, and more gain (there is less artificial light at longer ranges). Thus the longer range featurization optimizes terminal 1000 for decoding of longer range indicia while the shorter range featurization optimizes terminal 1000 for decoding of shorter range indicia.

Figure 4:
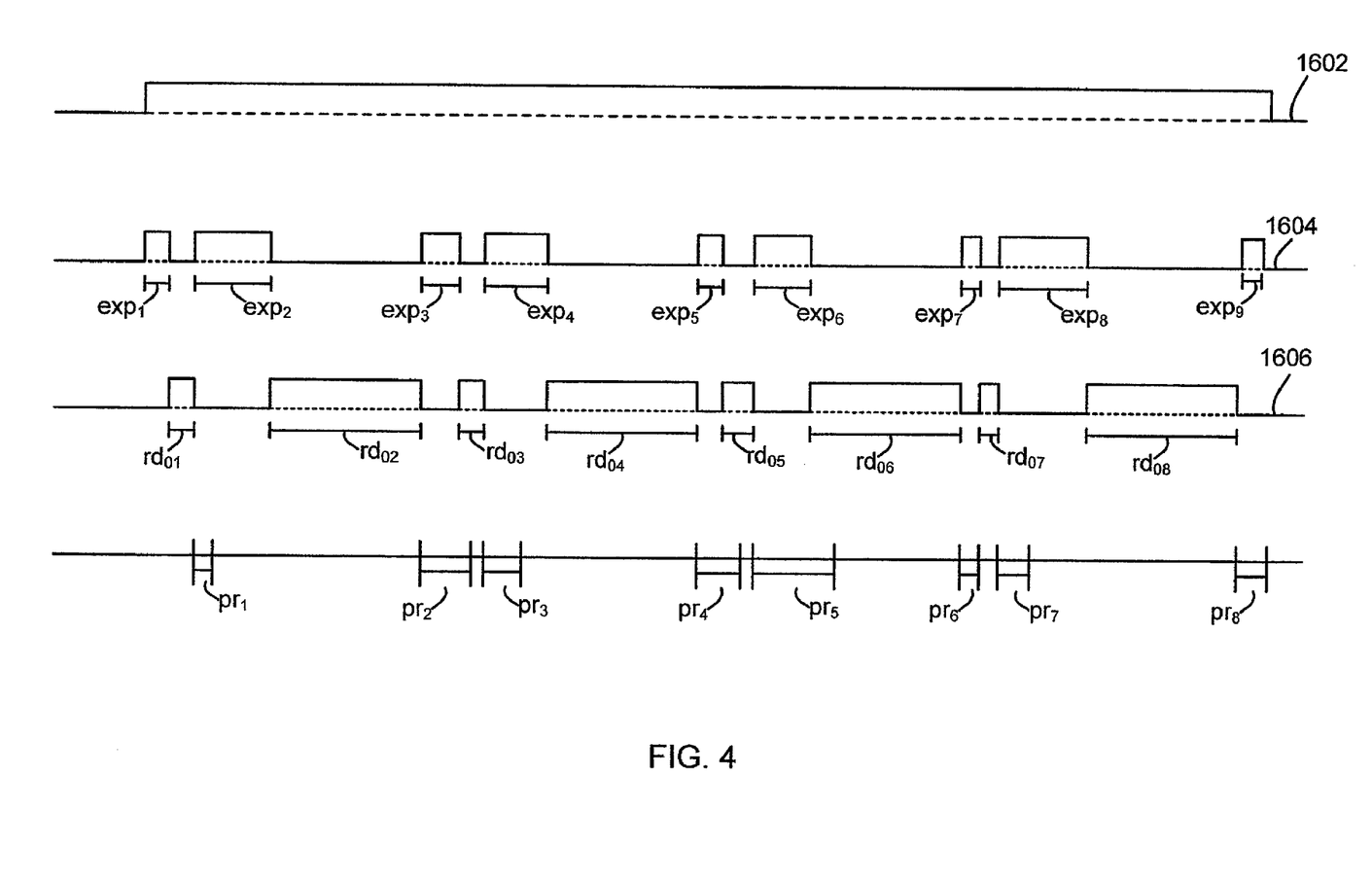
FIG. 4 is a timing diagram illustrating operation of an indicia reading terminal.
Figure 5:
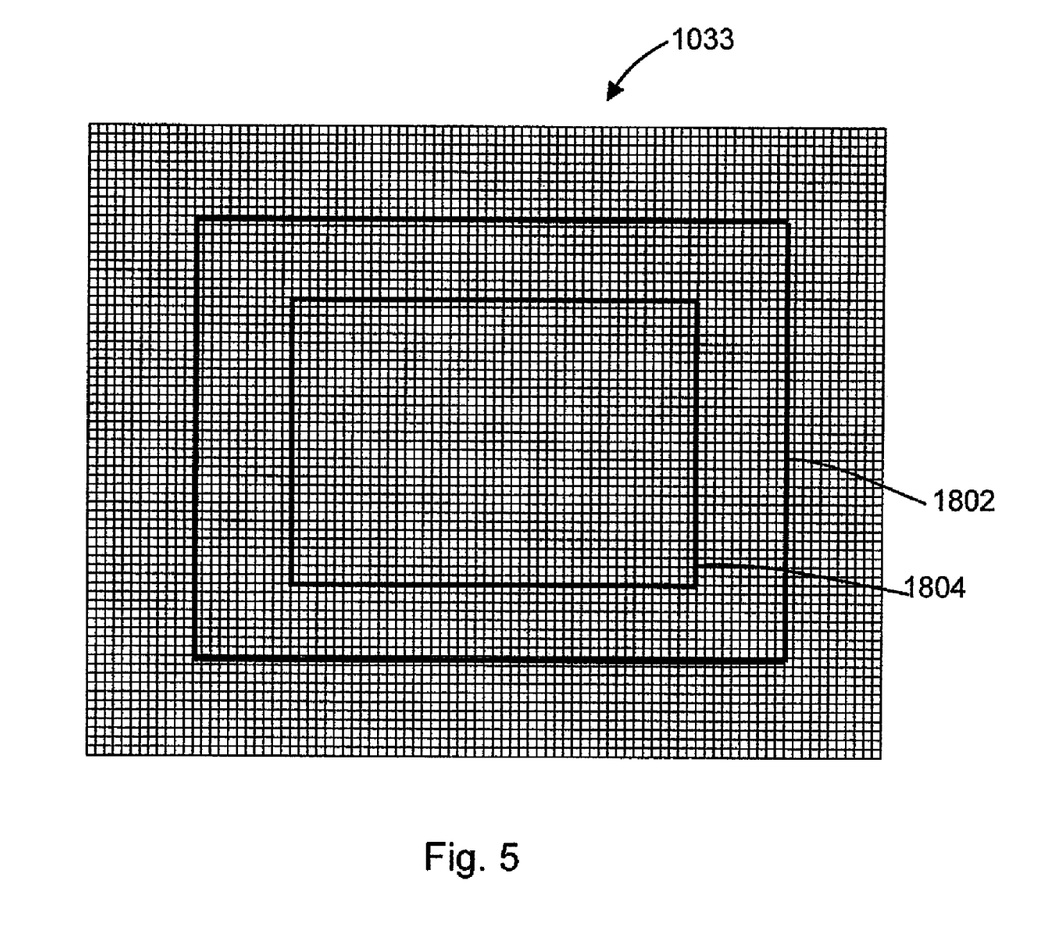
FIG. 5 is a top view of an image sensor array capable of being subject to readout of windows having first and second positions.

In the example of the timeline of FIG. 4, it is seen that the featurization including a smaller window size is associated to an initial exposure of smaller value, and that the featurization including a larger window is associated to a larger initial exposure value. Such an embodiment can be useful e.g., in an application wherein terminal 1000 is to be used to read decodable indicia in bright sunlight. In such an application, frames exposed at longer terminal to target distances can be expected to be optimally exposed with shorter exposure periods, since reflected ambient light may be significant. At nearer terminal to target distances, sunlight may be blocked from reading a field of view by a terminal housing and therefore a longer exposure period may be useful.

In another embodiment, the described operation of terminal 1000 operative to capture and process a plurality of alternating frames of different featurizations can be incorporated in a terminal having a plurality of optical assemblies, where a first of the optical assemblies has a first, relatively longer best focus distance and focuses imaging light rays on a first set of pixels of image sensor array 1033 and a second of the optical assemblies has a relatively shorter best focus distance and focuses imaging light rays on a second set of pixels of image sensor array 1033. In such an embodiment, the window position of the first featurization can correspond to the first subset of pixels and the window position of the second featurization can correspond to the second subset of pixels. A higher initial gain, $g_0$ and a longer initial exposure period, $e_0$ can be associated to the first featurization having an associated window corresponding to the first set of pixels. Accordingly, frames optimized for use in decoding of decodable indicia at long range that are subject to capture can have longer associated frame exposure periods and/or higher gain to compensate for an expected lack of artificial light emitted from the terminal at the longer reading range.

Figure 6:
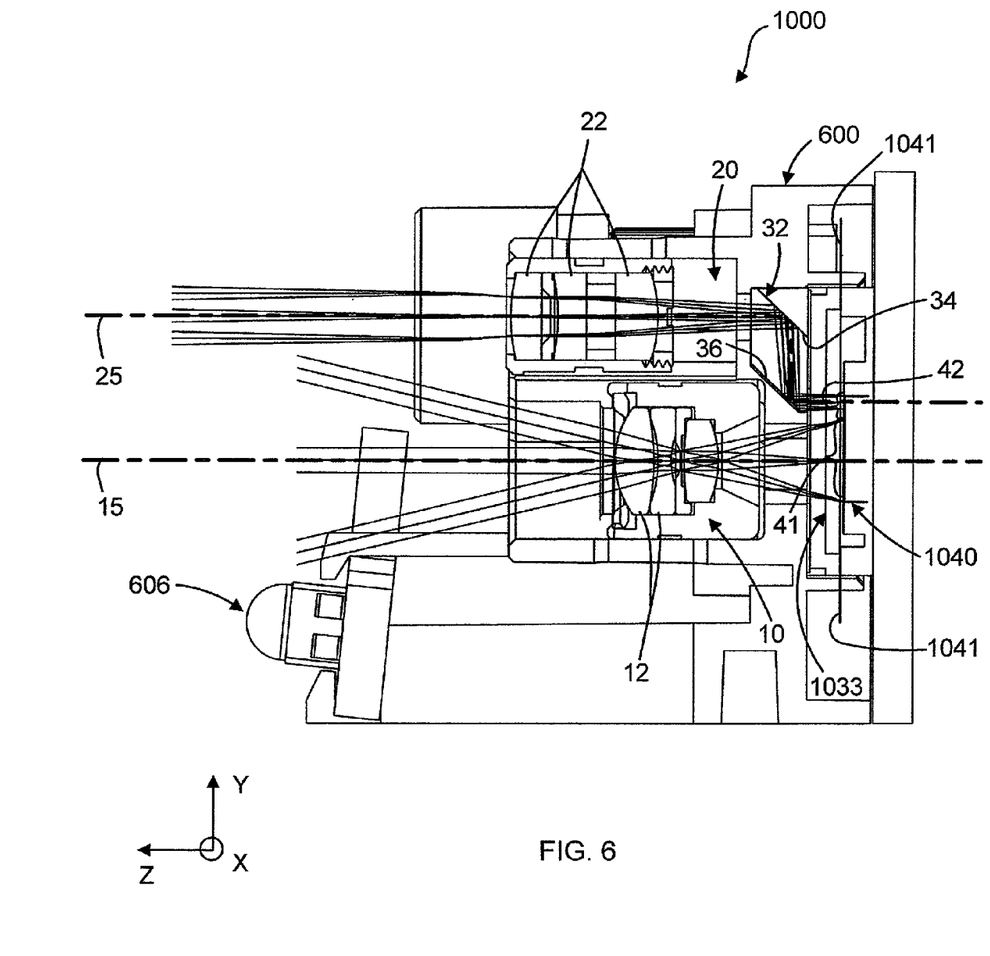
FIG. 6 is a side view of an imaging module.
Figure 7:
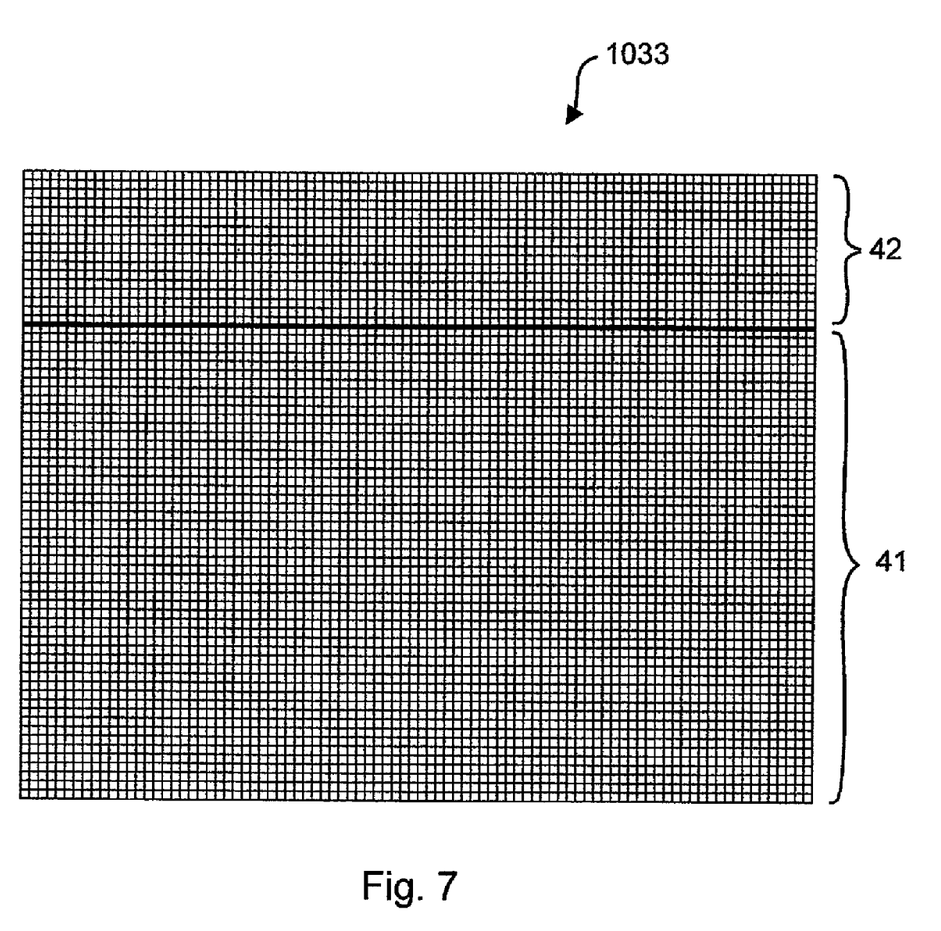
FIG. 7 is a schematic top view of an image sensor array capable of being subject to readout of windows having first and second positions.

Further aspects of an exemplary indicia reading terminal having first and second optical assemblies are described with reference to FIGS. 6-8.

A cross sectional side view of an exemplary imaging module 600 of indicia reading terminal 1000 in one embodiment is shown in FIG. 8. Terminal 1000 can have a first optical assembly 10 and a second optical assembly 20. Terminal 1000 can also have an image sensor array 1033 including a plurality of pixels and can be configured so that first optical assembly 10 focuses imaging light rays onto a first set of pixels 41 of an image sensor array 1033 and a second optical assembly 20 focuses imaging light rays onto a second set of pixels 42 of the image sensor array 1033. Indicia reading terminal 1000 can be adapted to process image data corresponding to pixels of the image sensor array 1033 for attempting to decode a decodable indicia.

A top view of an image sensor array 1033 incorporated into imaging module 600 is shown in FIG. 8. Image sensor array 1033 can include first set of pixels 41 onto which light transmitted by first optical assembly 10 is incident and second set of pixels 42 onto which light transmitted by second optical assembly 20 is incident. First set of pixels 41 can comprise the pixels of more than 50% of the rows of pixels of array 1033, and second set of pixels 42 can comprise the pixels of less than 50% of the rows of pixels of array 1033. In another embodiment, first set of pixels 41 can comprise about 60% of the rows of pixels of array 1033, and second set of pixels 42 can comprise about 40% of the rows of pixels of array 1033. In another embodiment, first set of pixels 41 can comprise about 75% of the rows of pixels of array 1033, and second set of pixels 42 can comprise about 25% of the rows of pixels of array 1033 as is shown in FIG. 8. A particular embodiment of image sensor array 1033 that is divided into a first set of pixels 41 and a second set of pixels 42 is summarized herein below in Table B.

TABLE B

| | |
|---|---|
| Pixel Size: | 0.0058 mm square |
| Active array matrix: | 838 H by 640 V |
| Active array size: | 4.8604 mm × 3.712 mm |
| 1D array matrix: | 838 H by 160 V |
| 1D array size: | 4.8604 mm × 0.928 mm |
| 2D array matrix: | 838 H by 480 V |
| 2D array size: | 4.8604 mm × 2.784 mm |
| Separation (from centers) 1D & 2D areas | 1.856 mm |

In the exemplary embodiment, the first and second optical assemblies can have different characteristics. In one aspect the first and second optical assemblies can have different characteristics in terms of their folding of a center optical axis. In another aspect the first and second optical assemblies can have different focal lengths. In yet another aspect the first and second optical assemblies can have different best focus distances so that the first optical assembly 10 provides optimal focusing at a first terminal to target distance and the second optical assembly 20 provides optimal focusing at a second best focus distance.

A hardware platform suitable for supporting operational aspects of an indicia reading terminal described herein in the aspects that differ from those described with reference to FIG. 2 are described with reference to FIG. 8.

As illustrated in FIG. 8 and as described further herein, terminal 1000 can include a first optical assembly 10 and a second optical assembly 20. The first optical assembly 10 can have an imaging lens 12 and a center optical axis 15 and the second optical assembly 20 can include an imaging lens 22, center optical axis 25 and a prism 32 for folding the center optical axis 25 of the second optical assembly 20. First optical assembly 10 together with image sensor array 1033 can define an associated first field of view 13 on a target substrate 50 and second optical assembly 20 can define an associated second field of view 23 on a target substrate 50 in one embodiment. The first and second optical assemblies need not comprise separate components. For example, in one embodiment, the first and second optical assemblies can be formed on a unitary piece of polycarbonate material.

Terminal 1000 can also include an illumination pattern light source bank 606 for use in projecting an illumination pattern 60 on target substrate 50 and an aiming pattern light source bank 618 for use in projecting pattern 70 on substrate 50. Each of bank 606 and bank 618 can include one or more light sources. Terminal 1000 can include shaping optics 607, 619 for shaping light from light source banks 606 and 618, respectively, so that light from banks 606 and 618 can be projected into the aforementioned pattern 60 and pattern 70 respectively. In use, terminal 1000 can be oriented by an operator with respect to a substrate 50 bearing decodable indicia 115 in such manner that aiming pattern 70 is projected on a decodable indicia 115, that can be disposed on a target substrate 50. In the example of FIG. 8, decodable indicia 115 is provided by a 1D bar code symbol. Decodable indicia could also be provided by 2D bar code symbols or optical character recognition (OCR) characters. Each of illumination pattern light source bank 606 and aiming pattern light source bank 618 can include one or more light sources. Illumination assembly control circuit 1620 can send signals to illumination pattern light source bank 606 e.g., for changing a level of illumination output by illumination pattern light source bank 606. The combination of light source bank 606 and shaping optics 607 for shaping light from bank 606 for projecting pattern 60 can be regarded as an illumination pattern generator. The combination of illumination light source bank 618 and shaping optics 619 for shaping light from bank 618 for projecting pattern 70 can be regarded as an aiming pattern generator. In addition to or as an alternative to having an aiming pattern generator provided by the combination of light source bank 618 and shaping optics 619, terminal 1000 can have an aiming pattern generator provided by the combination of light source bank 620 and shaping optics 621. In a further aspect, terminal 1000 can be coupled to system bus 1500 via interface 1618.

CPU 1060, appropriately programmed can carry out a decoding process for attempting to decode a frame of image data. Terminal 1000 can be operative so that CPU 1060 for attempting to decode a frame of image data can address image data of a frame stored in RAM 1080 and can process such image data. For attempting to decode, CPU 1060 can sample image data of a captured frame of image data along a sampling path, e.g., along a first sampling path through a first set of pixel positions corresponding to a first set of pixels 41 and along a second sampling path through a second set of pixel positions corresponding to a second set of pixels 42. Next, CPU 1060 can perform a second derivative edge detection to detect edges. After completing edge detection, CPU 1060 can determine data indicating widths between edges. CPU 1060 can then search for start/stop character element sequences and if found, derive element sequence characters, character by character by comparing with a character set table. For certain symbologies, CPU 1060 can also perform a checksum computation. If CPU 1060 successfully determines all characters between a start/stop character sequence and successfully calculates a checksum (if applicable), CPU 1060 can output a decoded message. Where a decodable indicia representation is a 2D bar code symbology, a decode attempt can comprise the steps of locating a finder pattern using a feature detection algorithm, locating scan lines intersecting the finder pattern according to a predetermined relationship with the finder pattern, determining a pattern of dark and light cells along the scan lines, and converting each light pattern into a character or character string via table lookup.

Figure 9:
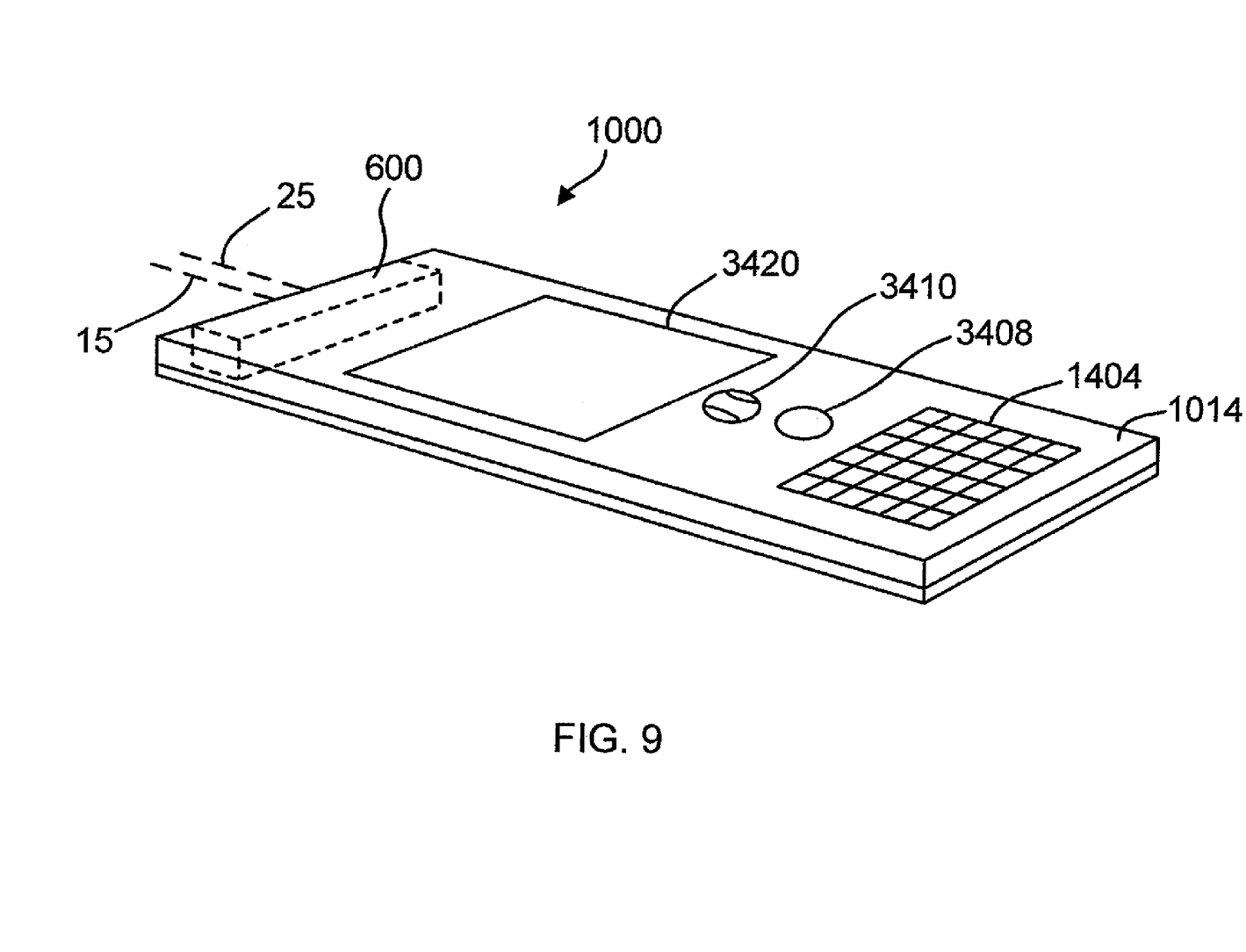
FIG. 9 is a perspective view of an indicia reading terminal.

A physical form view of terminal 1000 in one embodiment is shown in FIG. 9. Display 3420, trigger 3408, keyboard 1404, and pointer mechanism 3410 can be disposed on a common side of a hand held housing 1014 as shown in FIG. 9. Optical elements, illumination elements, and image sensor integrated circuit 1040 as set forth in various embodiments herein can be incorporated in an imaging module 600 that is disposed within hand held housing 1014. Terminal 1000 can be adapted so that housing 1014 encapsulates components shown in the electrical block diagrams set forth herein, including image sensor 1032 having image integrated circuit 1040 having image sensor array 1033. Display 3420 and pointer mechanism 3410 in combination can be regarded as a user interface of terminal 1000. A user interface of terminal 1000 can also be provided by configuring terminal 1000 to be operative to be reprogrammed by decoding of programming bar code symbols. A hand held housing 1014 for terminal 1000 can in another embodiment be devoid of a display and can be in a gun style form factor. Shown as having first and second imaging axes 25 and 15, terminal 1000 can include a single imaging axis where terminal 1000 includes a single optical assembly.

A small sample of systems methods and apparatus that are described herein is as follows:

A1. An indicia reading terminal comprising:
  a two dimensional image sensor array, said two dimensional image sensor array having a plurality of pixels;
  at least one optical assembly for focusing light rays onto the image sensor array;
  wherein the terminal is operative so that during an operator activated read attempt the terminal captures and processes alternating frames of image data having respective first and second featurizations, the first featurization having an associated first window position and one or more of (a) an associated first exposure control process; and (b) an associated first gain control process, the second featurization having an associated second window position and one or more of (a) an associated second exposure control process; and (b) an associated second gain control process;
  wherein the terminal is operative to process a frame of the first frame featurization for attempting to decode a decodable indicia.

A2. The indicia reading terminal of claim A1, wherein the first featurization has an associated first exposure control process.

A3. The indicia reading terminal of claim A1, wherein the first featurization has an associated first gain control process.

A4. The indicia reading terminal of claim A1, wherein the first featurization has an associated first exposure control process and an associated first gain control process.

A5. The indicia reading terminal of claim A1, wherein the first featurization has an associated exposure control process, and wherein the indicia reading terminal according to the associated exposure control process of the first featurization preferentially utilizes frame data of frames of the first featurization.

A6. The indicia reading terminal of claim A1, wherein the first featurization has an associated first gain control process, and wherein the indicia reading terminal according to the associated gain control process of the first featurization preferentially utilizes frame data of frames of the first featurization.

A7. The indicia reading terminal of claim A1, wherein the first featurization has an associated first exposure control process, and wherein the indicia reading terminal according to the associated first exposure control process of the first featurization applies a first initial frame exposure value, and further wherein the second featurization has an associated second exposure control process, and wherein the indicia reading terminal according to the second associated exposure control process of the second featurization applies a second initial frame exposure value.

A8. The indicia reading terminal of claim A1, wherein the first featurization has an associated first exposure control process, and wherein the indicia reading terminal according to the associated first gain control process of the first featurization applies a first initial frame gain value, and further wherein the second featurization has an associated second gain control process, and wherein the indicia reading terminal according to the associated second gain control process of the second featurization applies a second initial frame gain value.

A9. The indicia reading terminal of claim A1, wherein a set of frames of the first featurization has a period of one frame.

A10. The indicia reading terminal of claim A1, wherein a set of frames of the first featurization has a period of two frames.

A11. The indicia reading terminal of claim A1, wherein the indicia reading terminal includes a first register for storing a first parameter of a first parameter type associated with the first featurization, and a second register for storing a second parameter of the first parameter type associated with the second featurization.

B1. An indicia reading terminal comprising:
  a two dimensional image sensor array, said two dimensional image sensor array comprising a plurality of pixels;
  a first optical assembly having a center optical axis and an imaging lens, said first optical assembly for focusing imaging light rays onto a first set of pixels of said two dimensional image sensor array, wherein said imaging light rays transmitted by said first optical assembly are transmitted about said center optical axis of said first optical assembly;
  a second optical assembly having a center optical axis and an imaging lens, said second optical assembly for focusing imaging light rays onto a second set of pixels of said two dimensional image sensor array, wherein said imaging light rays transmitted by said second optical assembly are transmitted about said center optical axis of said second optical assembly;
  wherein the terminal is operative so that during an operator activated read attempt the terminal captures and processes alternating frames of image data having respective first and second featurizations, the first featurization having an associated first window position corresponding to the first set of pixels and one or more of (a) an associated first exposure control process; and (b) an associated first gain control process, the second featurization having an associated second window position corresponding to the second set of pixels and one or more of (a) an associated second exposure control process; and (b) an associated second gain control process;
  wherein the terminal is operative to process a frame of the first frame featurization for attempting to decode a decodable indicia.

B2. The indicia reading terminal of claim B1, wherein the first featurization has associated first exposure control process.

B3. The indicia reading terminal of claim B1, wherein the first featurization has an associated first gain control process.

B4. The indicia reading terminal of claim B1, wherein the first featurization has an associated first exposure control process and a first associated gain control process.

B5. The indicia reading terminal of claim B1, wherein the first featurization has an associated first exposure control process, and wherein the indicia reading terminal according to the associated exposure control process of the first featurization preferentially utilizes frame data of frames of the first featurization.

B6. The indicia reading terminal of claim B1, wherein the first featurization has an associated first gain control process, and wherein the indicia reading terminal according to the associated gain control process of the first featurization preferentially utilizes frame data of frames of the first featurization.

B7. The indicia reading terminal of claim B1, wherein the first featurization has an associated first exposure control process, and wherein the indicia reading terminal according to the associated exposure control process of the first featurization applies a first initial frame exposure value, and further wherein the second featurization has an associated second exposure control process, and wherein the indicia reading terminal according to the associated second exposure control process of the second featurization applies a second initial frame exposure value.

B8. The indicia reading terminal of claim B1, wherein the first featurization has an associated first gain control process, and wherein the indicia reading terminal according to the associated first gain control process of the first featurization applies a first initial frame gain value, and further wherein the second featurization has an associated second gain control process, and wherein the indicia reading terminal according to the associated second gain control process of the second featurization applies a second initial frame gain value.

B9. The indicia reading terminal of claim B1, wherein a set of frames of the first featurization has a period of one frame.

B10. The indicia reading terminal of claim B1, wherein a set of frames of the first featurization has a period of two frames.

B11. The indicia reading terminal of claim B1, wherein the first featurization has an associated first exposure control process, and wherein the indicia reading terminal according to the associated first exposure control process of the first featurization applies a first initial frame exposure value, and further wherein the second featurization has an associated second exposure control process, and wherein the indicia reading terminal according to the associated second exposure control process of the second featurization applies a second initial frame exposure value, wherein the first optical assembly has a farther best focus distance than the second optical assembly best focus distance and wherein the first initial exposure value is of greater duration than the second initial exposure value.

B12. The indicia reading terminal of claim B1, wherein the first featurization has an associated first gain control process, and wherein the indicia reading terminal according to the associated first gain control process of the first featurization applies a first initial frame gain value, and further wherein the second featurization has an associated second gain control process, and wherein the indicia reading terminal according to the associated second gain control process of the second featurization applies a second initial frame gain value, wherein the first optical assembly has a farther best focus distance than the second optical assembly best focus distance and wherein the first initial gain value is greater than the second initial gain value.

B13. The indicia reading terminal of claim B1, wherein the indicia reading terminal includes a first register for storing a first parameter of a first parameter type associated with the first featurization, and a second register for storing a second parameter of the first parameter type associated with the second featurization.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

We claim:

1. An indicia reading terminal comprising:
a two dimensional image sensor array, said two dimensional image sensor array having a plurality of pixels;
at least one optical assembly for focusing light rays onto the image sensor array;
wherein the terminal is operative so that during an operator activated read attempt the terminal captures and processes alternating frames of image data having respective first and second featurizations, the first featurization having an associated first window position and one or more of (a) an associated first exposure control process; and (b) an associated first gain control process, the second featurization having an associated second window position and one or more of (a) an associated second exposure control process; and (b) an associated second gain control process;
wherein the terminal is operative to process a frame of the first featurization for attempting to decode a decodable indicia.

2. The indicia reading terminal of claim 1, wherein the first featurization has an associated first exposure control process.

3. The indicia reading terminal of claim 1, wherein the first featurization has an associated first gain control process.

4. The indicia reading terminal of claim 1, wherein the first featurization has an associated first exposure control process and an associated first gain control process.

5. The indicia reading terminal of claim 1, wherein the first featurization has an associated exposure control process, and wherein the indicia reading terminal according to the associated exposure control process of the first featurization preferentially utilizes frame data of frames of the first featurization.

6. The indicia reading terminal of claim 1, wherein the first featurization has an associated first gain control process, and wherein the indicia reading terminal according to the associated gain control process of the first featurization preferentially utilizes frame data of frames of the first featurization.

7. The indicia reading terminal of claim 1, wherein the first featurization has an associated first exposure control process, and wherein the indicia reading terminal according to the associated first exposure control process of the first featurization applies a first initial frame exposure value, and further wherein the second featurization has an associated second exposure control process, and wherein the indicia reading terminal according to the second associated exposure control process of the second featurization applies a second initial frame exposure value.

8. The indicia reading terminal of claim 1, wherein the first featurization has an associated first exposure control process, and wherein the indicia reading terminal according to the associated first gain control process of the first featurization applies a first initial frame gain value, and further wherein the second featurization has an associated second gain control process, and wherein the indicia reading terminal according to the associated second gain control process of the second featurization applies a second initial frame gain value.

9. The indicia reading terminal of claim 1, wherein a set of frames of the first featurization has a period of one frame.

10. The indicia reading terminal of claim 1, wherein a set of frames of the first featurization has a period of two frames.

11. The indicia reading terminal of claim 1, wherein the indicia reading terminal includes a first register for storing a first parameter of a first parameter type associated with the first featurization, and a second register for storing a second parameter of the first parameter type associated with the second featurization.

12. An indicia reading terminal comprising:
a two dimensional image sensor array, said two dimensional image sensor array comprising a plurality of pixels;
a first optical assembly having a center optical axis and an imaging lens, said first optical assembly for focusing imaging light rays onto a first set of pixels of said two dimensional image sensor array, wherein said imaging light rays transmitted by said first optical assembly are transmitted about said center optical axis of said first optical assembly;

a second optical assembly having a center optical axis and an imaging lens, said second optical assembly for focusing imaging light rays onto a second set of pixels of said two dimensional image sensor array, wherein said imaging light rays transmitted by said second optical assembly are transmitted about said center optical axis of said second optical assembly;

wherein the terminal is operative so that during an operator activated read attempt the terminal captures and processes alternating frames of image data having respective first and second featurizations, the first featurization having an associated first window position corresponding to the first set of pixels and one or more of (a) an associated first exposure control process; and (b) an associated first gain control process, the second featurization having an associated second window position corresponding to the second set of pixels and one or more of (a) an associated second exposure control process; and (b) an associated second gain control process;

wherein the terminal is operative to process a frame of the first featurization for attempting to decode a decodable indicia.

13. The indicia reading terminal of claim 12, wherein the first featurization has associated first exposure control process.

14. The indicia reading terminal of claim 12, wherein the first featurization has an associated first gain control process.

15. The indicia reading terminal of claim 12, wherein the first featurization has an associated first exposure control process and a first associated gain control process.

16. The indicia reading terminal of claim 12, wherein the first featurization has an associated first exposure control process, and wherein the indicia reading terminal according to the associated exposure control process of the first featurization preferentially utilizes frame data of frames of the first featurization.

17. The indicia reading terminal of claim 12, wherein the first featurization has an associated first gain control process, and wherein the indicia reading terminal according to the associated gain control process of the first featurization preferentially utilizes frame data of frames of the first featurization.

18. The indicia reading terminal of claim 12, wherein the first featurization has an associated first exposure control process, and wherein the indicia reading terminal according to the associated exposure control process of the first featurization applies a first initial frame exposure value, and further wherein the second featurization has an associated second exposure control process, and wherein the indicia reading terminal according to the associated second exposure control process of the second featurization applies a second initial frame exposure value.

19. The indicia reading terminal of claim 12, wherein the first featurization has an associated first gain control process, and wherein the indicia reading terminal according to the associated first gain control process of the first featurization applies a first initial frame gain value, and further wherein the second featurization has an associated second gain control process, and wherein the indicia reading terminal according to the associated second gain control process of the second featurization applies a second initial frame gain value.

20. The indicia reading terminal of claim 12, wherein a set of frames of the first featurization has a period of one frame.

21. The indicia reading terminal of claim 12, wherein a set of frames of the first featurization has a period of two frames.

22. The indicia reading terminal of claim 12, wherein the first featurization has an associated first exposure control process, and wherein the indicia reading terminal according to the associated first exposure control process of the first featurization applies a first initial frame exposure value, and further wherein the second featurization has an associated second exposure control process, and wherein the indicia reading terminal according to the associated second exposure control process of the second featurization applies a second initial frame exposure value, wherein the first optical assembly has a farther best focus distance than a best focus distance of the second optical assembly and wherein the first initial exposure value is of greater duration than the second initial exposure value.

23. The indicia reading terminal of claim 12, wherein the first featurization has an associated first gain control process, and wherein the indicia reading terminal according to the associated first gain control process of the first featurization applies a first initial frame gain value, and further wherein the second featurization has an associated second gain control process, and wherein the indicia reading terminal according to the associated second gain control process of the second featurization applies a second initial frame gain value, wherein the first optical assembly has a farther best focus distance than a best focus distance of the second optical assembly and wherein the first initial gain value is greater than the second initial gain value.

24. The indicia reading terminal of claim 12, wherein the indicia reading terminal includes a first register for storing a first parameter of a first parameter type associated with the first featurization, and a second register for storing a second parameter of the first parameter type associated with the second featurization.

* * * * *